July 27, 1965 M. BENTELE 3,196,852
ROTATING COMBUSTION ENGINE WITH DIRECT FUEL INJECTION
Filed Nov. 2, 1962 7 Sheets-Sheet 1

INVENTOR.
MAX BENTELE
BY
ATTORNEY

INVENTOR.
MAX BENTELE
BY
ATTORNEY

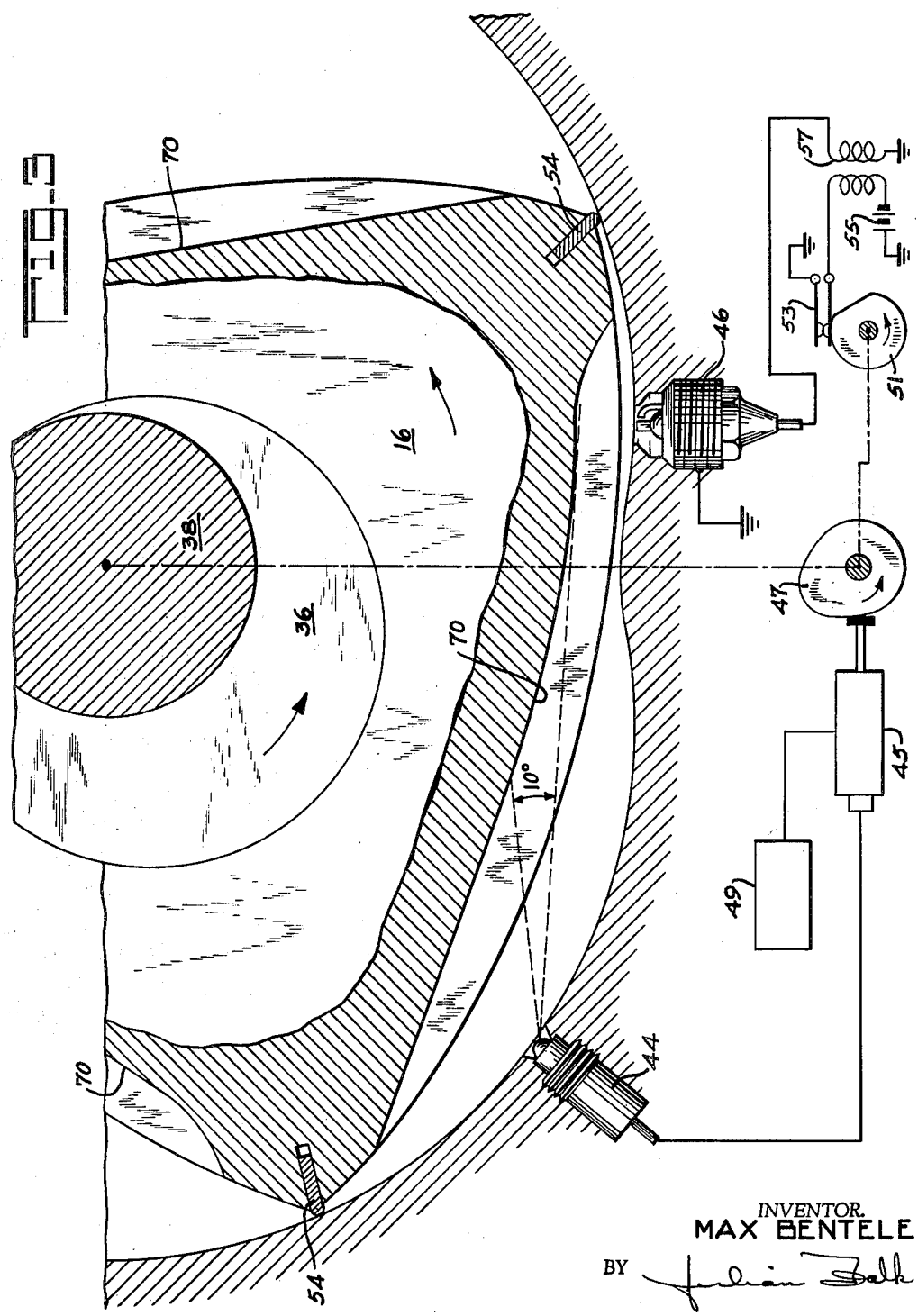

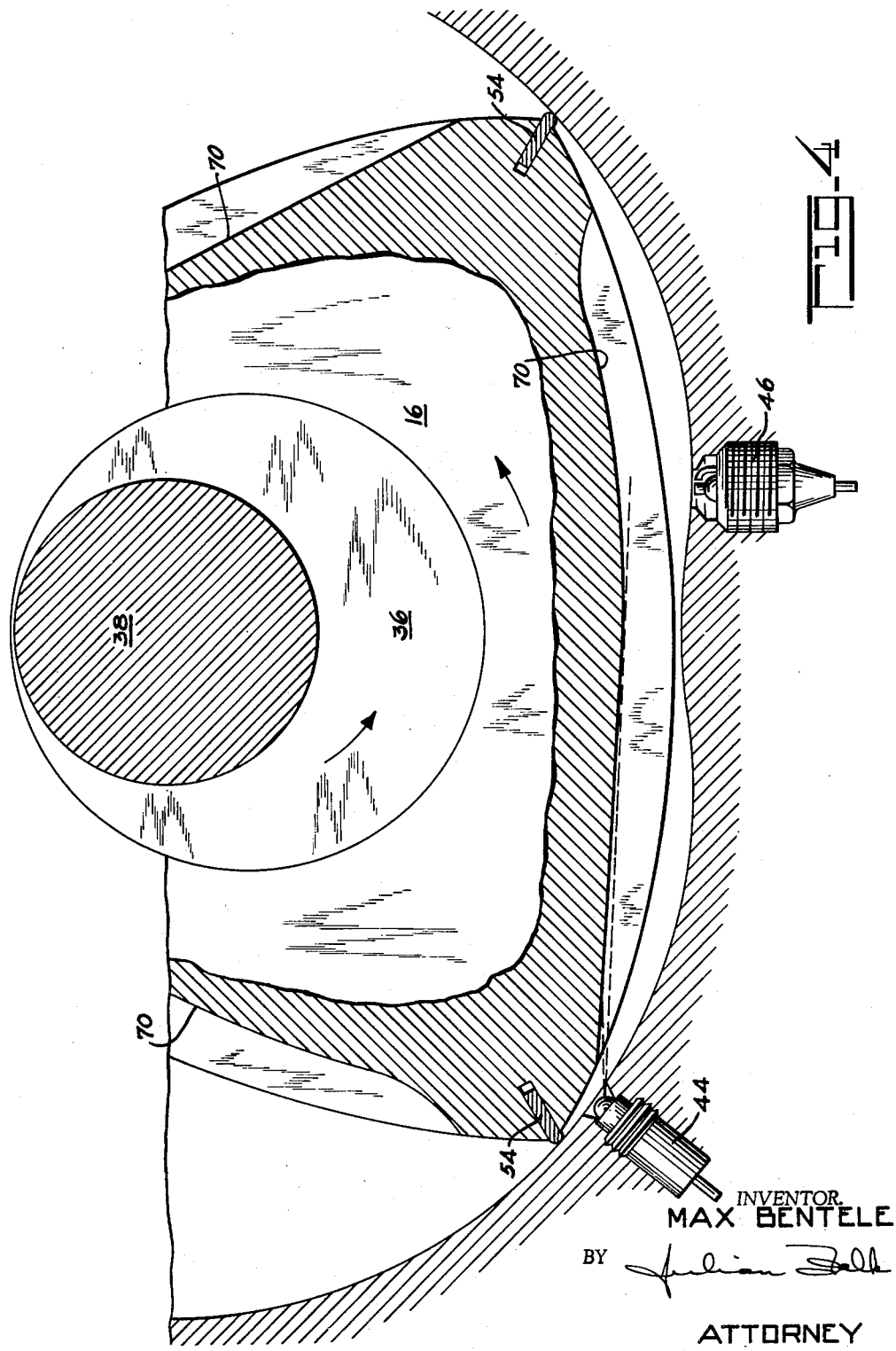

July 27, 1965            M. BENTELE            3,196,852
ROTATING COMBUSTION ENGINE WITH DIRECT FUEL INJECTION
Filed Nov. 2, 1962            7 Sheets-Sheet 5
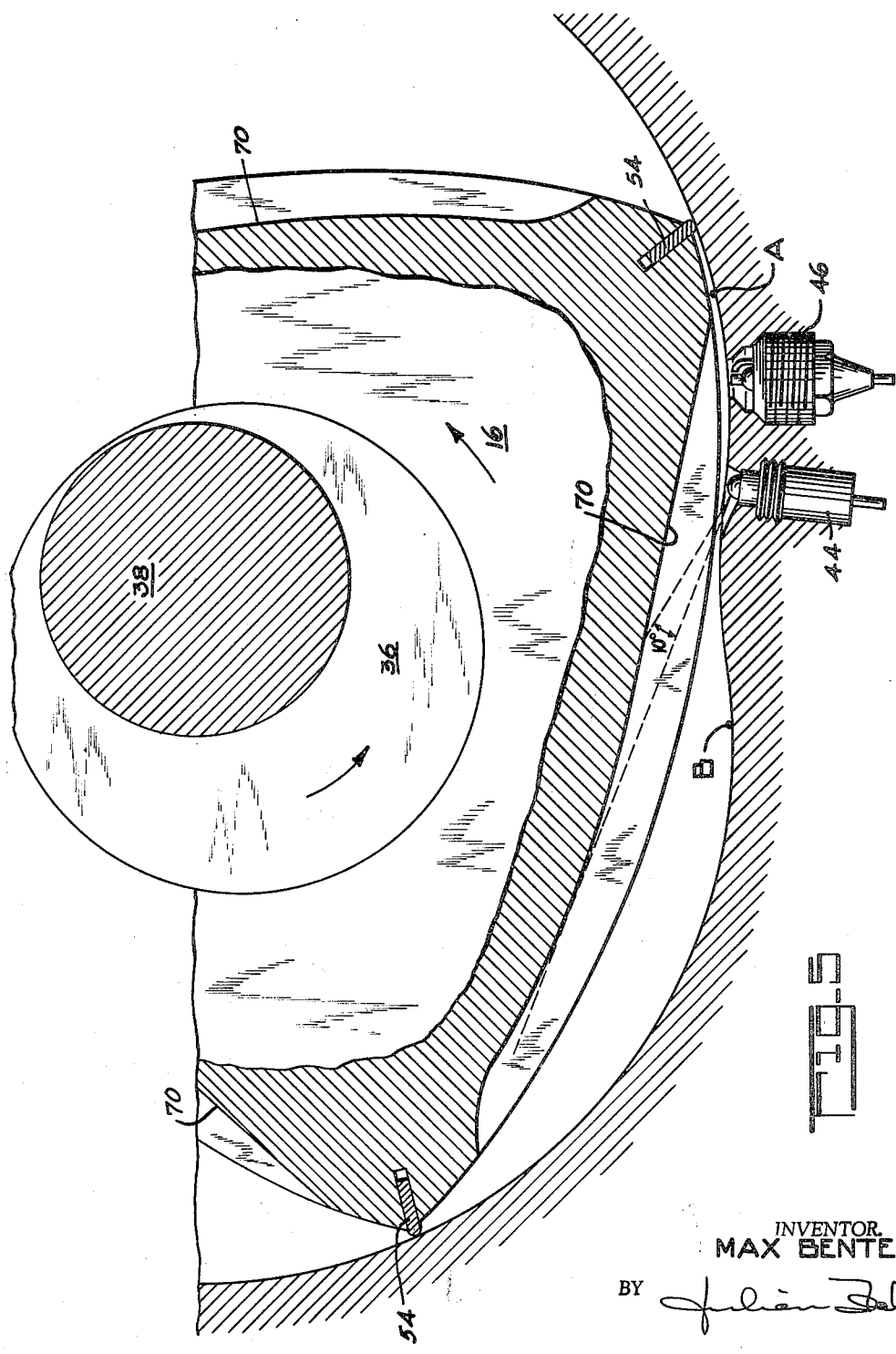
INVENTOR.
MAX BENTELE July 27, 1965 M. BENTELE 3,196,852
ROTATING COMBUSTION ENGINE WITH DIRECT FUEL INJECTION
Filed Nov. 2, 1962 7 Sheets-Sheet 6

INVENTOR.
MAX BENTELE
BY
ATTORNEY

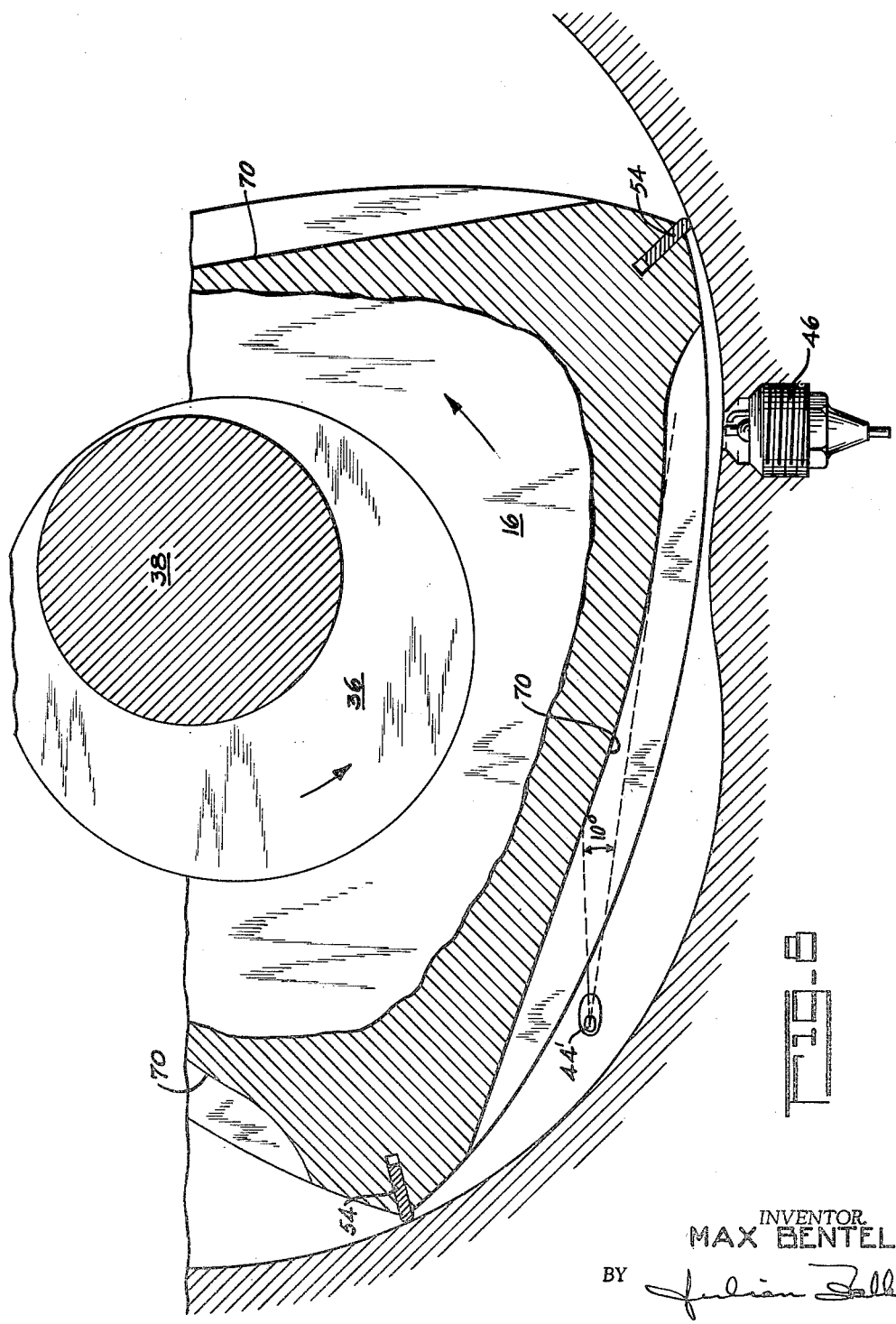

United States Patent Office 3,196,852
Patented July 27, 1965

3,196,852
ROTATING COMBUSTION ENGINE WITH DIRECT FUEL INJECTION
Max Bentele, Ridgewood, N.J., assignor to Curtiss-Wright Corporation, a corporation of Delaware
Filed Nov. 2, 1962, Ser. No. 235,061
11 Claims. (Cl. 123—8)

This invention relates to rotary combustion engines and in particular to a direct fuel injection means for said engines. A rotary combustion engine as described herein may be of the type disclosed in United States Patent 2,988,065 issued to Felix Wankel et al.

Rotary combustion engines of the type shown in the aforementioned patent generally comprise an outer body composed of a peripheral wall interconnected with a pair of end walls to form a cavity whose profile preferably is basically an epitrochoid. An inner body or rotor is rotatably supported on a shaft within said outer body and has a plurality of circumferentially spaced apex portions for sealing engagement with the inner surface of the peripheral wall. The rotor is rotatable relative to the outer body such that the apex portions continuously engage the inner surface of said peripheral wall to form a plurality of working chambers which vary in volume during engine operation. An intake port is provided for admitting air or a fuel-air mixture to said working chambers for combustion therein and an exhaust port is provided for expelling the burnt gases from said chambers. An ignition means may be provided for igniting the fuel-air mixture which may be eliminated however, when the engine performs on the diesel cycle.

As is well known in present day internal combustion engines operating on the Otto cycle, the power output of the engine is limited by "detonation" or "knock," which is characterized by part of the charge of the fuel-air mixture burning with a velocity several times higher than normal. These engines are very sensitive to the type of fuel used which normally must have high anti-knock qualities. In internal combustion engines operating on the diesel cycle the highest power is determined by the "smoke limit" as well as the "detonation" limitation at which the maximum fuel can be burned effectively and without detrimental effects on engine operation over prolonged periods. Since diesel engines do not utilize spark ignition, operation is further limited to fuels having high ignition qualities. Also, diesel engines are characterized by low air utilization and high combustion pressures and are therefore relatively bulky and heavy. In addition rotary combustion engines take on certain undesirable characteristics when designed for high compression ratios, for example, the engine geometry has to be changed resulting in increased overall dimensions for the same displacement.

It is the primary purpose of the present invention to provide a rotary combustion engine which will operate effectively on a variety of fuels covering the full range of liquid petroleum products irrespective of their boiling limits, their ignitability or anti-knock quality at relatively low compression ratios, for example, from 6 to 12. The invention is generally carried out by injecting a relatively flat fan-like spray of fuel directly onto each working face of the rotor as each rotor working face reaches a predetermined position of rotation before its minimum volume top dead center position, and continuing said injection until said working face reaches a position in the region of its top dead center position. As the rotor rotates with respect to the injected spray of fuel, successive portions of the respective surface of each working face in the region of the injection nozzle will be covered with a solid film of fuel and the air being compressed between the rotor and the outer body within the working chambers will begin to gradually evaporate the film of fuel from its outermost portion or layer to form an ignitable fuel-air mixture. When combustion is initiated, only the fuel already mixed with air will ignite, and therefore, the burning of the fuel is controlled and proceeds until all of the fuel is evaporated and mixed with the air in the working chamber and eventually is consumed. The rate of evaporation of the fuel can be further controlled by providing means to regulate the temperature of the rotor faces which form part of the combustion chamber. In the present invention uncontrolled burning of the fuel is prevented and therefore, "knock" is eliminated and proper combustion occurs for all fuels irrespective of their ignitability or anti-knock quality.

Accordingly it is one object of the invention to provide a rotary combustion engine so constructed and so operated that fuel is burned at a controlled rate whereby the engine is rendered capable of using a wide variety of fuels without detonation.

It is also an object of the invention to provide a rotary combustion engine which will operate effectively on high viscosity and high ignition quality fuels at relatively low compression ratios.

An additional object of the invention is to provide a rotary combustion engine wherein the fuel is distributed over the faces of the rotor so that the mixing of the fuel with the proper amount of combustion air is facilitated.

A further object of the invention is to provide a rotary combustion engine in which high air utilization with relatively low combustion pressures, as compared to pressures in diesels, is achieved at high speeds.

Another object of the invention is to provide a rotary combustion engine in which delayed combustion effects on performance and exhaust smoke are avoided.

It is still another object of the invention to operate a rotary combustion engine in a manner such that controlled burning of all of the fuel-air mixture in the combustion zone, especially the very lean mixtures, is brought about thereby resulting in more economical usage of fuel.

Other objects and advantages of the invention will be apparent upon reading the following detailed description of the invention in connection with the accompanying drawings in which:

FIGS. 3 and 4 are diagrammatic views of one construction of the invention showing relative positions of the rotor and fuel injection means at 55° shaft rotation before its top dead center position and at 0° shaft rotation with respect to its top dead center position position, respectively;

FIGS. 5 and 6 are diagrammatic views of another construction of the invention showing relative positions of the rotor and fuel injection means at 55° shaft rotation before its top dead center position and at 0° shaft rotation with respect to its top dead center position, respectively;

FIG. 8 is a diagrammatic view of a portion of a rotary combustion engine illustrating an alternate location of the fuel injection nozzle.

Figure 1:
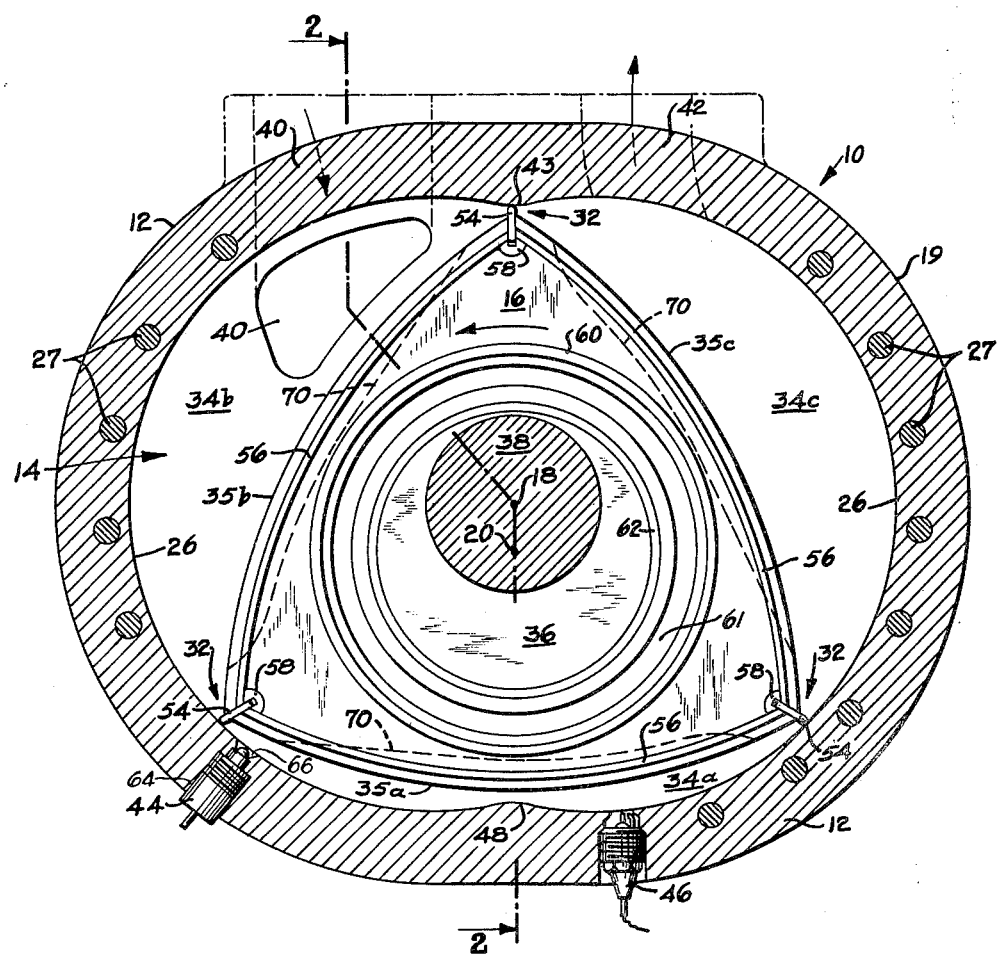
FIG. 1 is a transverse sectional view, taken along line 1—1 of FIG. 2, of a rotary combustion engine embodying the invention.
Figure 2:
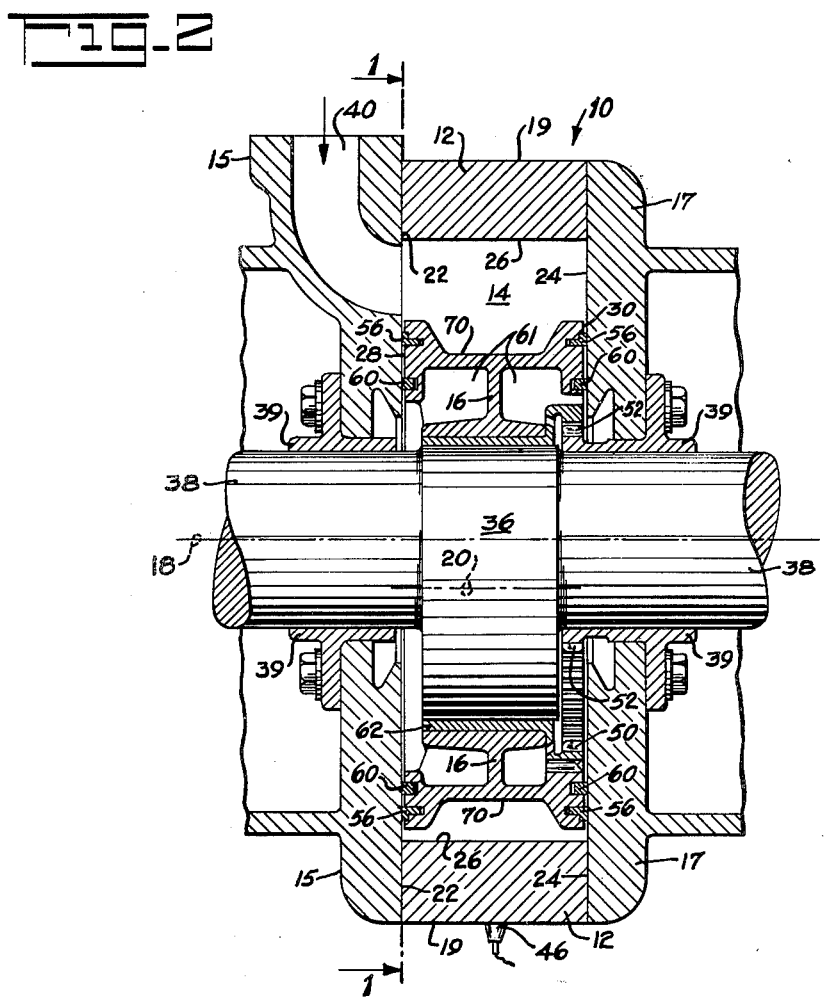
FIG. 2 is a sectional view taken along line 2—2 of FIG. 1.

Referring first to FIGS. 1 and 2 of the drawing, a rotary internal combustion engine according to the invention is indicated by reference numeral 10. The engine 10 comprises an outer body 12 having a cavity 14 within which an inner body or rotor 16 is received, said bodies being relatively rotatable and having laterally-spaced parallel axes 18 and 20 respectively. The outer body 12 comprises end housings 15 and 17 with axially-spaced end walls 22 and 24 respectively, and rotor housing 19 with peripheral wall 26 which interconnects the end walls to form said cavity 14. The end housings 15 and 17 are secured to rotor housing 19 as by bolts 27. In a plane normal to its axis 18, the inner surface of the peripheral wall 26 of the cavity 14 has a multi-lobed profile which preferably is basically an epitrochoid. In the specific embodiment illustrated the outer body cavity has two lobes, however, the outer body cavity may have a different number of lobes.

The inner body 16 has axially-spaced end faces 28 and 30 disposed adjacent to said outer body end walls and an outer surface with a plurality of circumferentially-spaced apex portions 32, said apex portions preferably being one more in number than the number of said outer body lobes. Thus, as illustrated, the inner body has three apex portions 32. The inner body apex portions 32 are in continuous engagement with the multi-lobed inner surface of the outer body to form a plurality (three in the embodiment illustrated) of working chambers 34a, 34b, and 34c between said two bodies which vary in volume upon relative rotation of the inner and outer bodies during engine operation. Between its apex portions the profile of the outer surface of the inner body is such as to operate in an interference free manner relative to the outer body. Thus, as illustrated, the outer surface of the inner body has a triangular profile with outwardly arched working faces 35a, 35b, and 35c, each said rotor working face forming a wall of its associated working chamber and during rotor rotation said working face approaches and recedes from the peripheral wall 26 to vary the volume of its associated working chamber.

In the embodiments illustrated, the outer body 12 is stationary while the inner body 16 is journaled on an eccentric portion 36 of a shaft 38 which rotates at a ratio of 3:1 with respect to said inner body 16. The shaft 38 is supported by bearings 39 carried by the outer body 12 and said shaft is co-axial with the geometrical axis 18 of the outer body 12 while the shaft eccentric portion 36 is co-axial with the inner body 16 which, as stated, is journaled on said eccentric portion. During engine operation the inner body 16 has a planetary motion (counterclockwise in FIG. 1) about the axis 18 of the outer body whereupon the working chambers 34a, 34b, and 34c vary in volume such that in each rotation of the inner body about the axis 18 of the outer body each chamber has two positions of minimum volume and two positions of maximum volume.

An intake means comprising an intake manifold (not shown) which is free of any variable throttle means and terminates in an intake passage 40 in the outer body end housing 17 is provided for admitting unthrottled air to the working chambers 34a, 34b, and 34c successively, and an exhaust passage 42 is provided in rotor housing 19 for exhausting combustion gases from said chambers, said passages being disposed on opposite sides of a junction 43 of the lobes of the outer body cavity with the exhaust port being on the upstream side of said junction relative to the direction of rotation of the inner rotor. A fuel injection nozzle 44 and an ignition means, for example a spark plug 46 for aiding in ignition of the fuel-air mixture, are provided in the outer body peripheral wall on the side opposite to the intake and exhaust passages and located in a region adjacent to the lobe junction 48, but preferably on opposite sides of said lobe junction. In an engine having a two-lobed epitrochoid and a three-lobed rotor, as illustrated, for downstream injection the nozzle 44 shown in the embodiment of FIGS. 1, 3, and 4 may be located in the peripheral wall upstream from the minor axis of the outer body within a portion of said wall whose two peripheral limits are defined by an apex portion rotated from the minor axis of the outer body in a direction opposite to the direction of rotor rotation, or in an upstream direction, within a range from 140° shaft angle to 180° shaft angle. The ignition means of an engine of this type in each of the embodiments disclosed, may be located in the peripheral wall within a portion of said wall whose two peripheral limits are defined by an apex portion rotated from the minor axis of the outer body from a position of 60° shaft angle upstream from the minor axis to a position of 80° shaft angle beyond or downstream from said minor axis. As diagrammatically illustrated in FIG. 3, the fuel injection nozzle 44 is connected to a suitable pump 45 driven from the engine shaft 38 by a suitable engaging cam 47 and is also connected to a fuel source 49 in order that fuel may be supplied to the nozzle 44 and injected against the surface of each working face 35a, 35b, and 35c in timed relation to the rotation of rotor 16. As further diagrammatically illustrated in FIG. 3, the ignition means may comprise, in addition to spark plug 46, a cam 51 driven by the engine shaft 38 which cooperates with a set of breaker points 53, a suitable source of electrical energy such as a battery 55 and coils 57 for firing the spark plug 46 in timed relation to the rotation of the shaft 38. The cam 51 and shaft 38 rotate together at a ratio of 3:1 with respect to the rotation of the rotor 16 and the breaker points 53 will be separately three times for each revolution of the rotor 16 since the cam 51 has only a single lobe for allowing the points to separate. Of course, the cam 51 is suitably designed so that the points will separate and fire the plug 46 through coils 57 at a predetermined time of rotation of a working face of the rotor as it passes plug 46 as will be further explained below. However, the invention is not intended to be limited to the ignition means diagrammatically illustrated and any suitable ignition means may be used. As is apparent from the drawing, the lobe junctions 43 and 48 are points of minimum radius on the multi-lobed profile of the inner surface of the peripheral wall 26. A minimum volume position of each working chamber 34a, 34b, and 34c in the region of lobe junction 48 (lower chamber position in FIG. 1) defines a top dead center position for the inner body. The rotor therefore passes through three top dead center positions during each revolution of the rotor.

During engine operation each of the working chambers has a cycle of operation including the four phases of intake, compression, expension and exhaust. In order to facilitate the relative motion of the inner body relative to the outer body, an internal gear 50 is, as illustrated, co-axially secured to the inner body. The internal gear 50 is disposed in mesh with a fixed gear 52 secured to the outer body, said fixed gear being co-axial with the shaft 38. Although, as illustrated and described, the outer body 12 is stationary and the inner body 16 has a planetary motion about the axis 18 of the outer body, it will be apparent that either body may be stationary while the other rotates or both said bodies may rotate in the same direction about their own axes.

For efficient operation, the working chambers are sealed between the apex portions 32 of the inner body 16 and the peripheral wall 26 of the outer body 12 as well as between the inner body end surfaces and the outer body end walls 22 and 24. As illustrated, the sealing means includes apex seal strip means 54 carried by the inner body 16 and extending along each apex portion 32 of said inner body for sealing engagement with the inner surface of the peripheral wall 26 of the outer body 12 and end face sealing element 56 carried by each end face sealing element 56 extending from one apex portion to the adjacent apex portion of the inner body for sealing engagement with the adjacent end wall of the outer body 12. In addition, intermediate sealing members 58 are provided at each end of each apex portion of the inner body 16 for sealing cooperation between adjacent ends of the seal means 54 and seal elements 56. An oil seal 60 is also provided at each end face of the inner body 16 adjacent to the bearing 62 between said inner body and the shaft eccentric 36 to minimize oil from leaking radially outwardly into the working chambers. The interior of the rotor is provided with a plurality of chambers 61 for receiving a liquid coolant so that the rotor faces which are exposed to the high heat produced during combustion may be cooled. The interior of the rotor may be provided with an oil cooling system such as that described in application Serial No. 206,753 filed July 2, 1962, and assigned to the same assignee as the present application although, insofar as the present invention is concerned, any suitable cooling system which will keep the temperature of the rotor faces within practical limits may be used.

As the engine operates, the various phases of the cycle in the working chambers 34 take place adjacent to the same portion of the outer body 12. Thus, for each working chamber combustion is initiated, after injection of fuel by the fuel injecton nozzle 44 preferably, by spark plug 46 which as already mentioned is located in region adjacent to the lobe junction 48 on the peripheral wall 26 of the outer body, as will be explained in greater detail below. However, in lieu of a spark plug, combustion may be initiated by a glow plug or hot bulb. It should be understood that the ignition means may be entirely eliminated and the engine run in the manner of a diesel engine wherein the pressure and temperature conditions toward the end of the compression phase are such that they bring about combustion of the fuel-air mixture, as is well known. When the engine is run in such a manner, ignition will occur in the same region wherein the spark plug would be located due to the favorable conditions at this region, these conditions being higher rotor housing inner wall temperatures, increased velocities and turbulence of the combustion air due to the relative motion of the rotor within the rotor housing.

As illustrated in FIGS. 1, 3 and 4 which illustrate the embodiment of the invention and as described above the fuel injection nozzle 44 is positioned in a small wall recess 64 in the peripheral wall which is located on one side of the lobe junction 48 in a region upstream from the lobe junction 48 with respect to the direction of rotation of the rotor 16 relative to the outer body 12. The nozzle 44 which is designed to emit a relatively flat fan-like spray into each working chamber may be tilted or have an outlet 66 which is angularly directed toward the lobe junction 48 so as to spray the fuel downstream against the associated working face of the rotor, as will be explained in greater detail below. Several advantages accrue from this location of the nozzle 44. Because of the fact that the nozzle is located in a relatively cool zone of the engine and because there is a substantial distance between the nozzle and the spark plug, cooling of the nozzle is facilitated and coking and cracking of the fuel within the fuel nozzle is eliminated. Also, only a small recess located a substantial distance away from the spark plug recess need be provided in the peripheral wall and therefore does not significantly affect the strength of this wall and further gas leakage across the apex seal when passing the recess is minimized.

As illustrated, each working face, 35a, 35b, and 35c of the rotor 16 is provided with a trough-like recess 70, each forming a wall portion of its associated working chamber. Each recess 70 functions to permit the working fluid to be transferred from one side to the other of the lobe junction 48 as the associated rotor working face travels through its dead center position. The working face recess 70 extends between the side faces 28 and 30 of the rotor, as shown in FIG. 2. The working face recesses 70 are designed so that at any position of rotation of the rotor during the injection period, the spray of fuel emitted from nozzle 44 will strike the face of recess 70 at a constant angle. Therefore, as illustrated in the embodiment of FIGS. 1–3 and 4, the shape of the working face recess 70 may be substantially symmetrical. As the rotor rotates past the position of the nozzle 44, the axis of the spray emitted from the nozzle during the injection period will always strike the rotor face at a constant angle namely, preferably within the range of 0° to 10° with respect to said rotor working faces. As illustrated in FIGS. 1 and 2, for example, the recesses 70 do not extend entirely across the width of the rotor, as shown by the dotted lines of FIG. 1. It should be understood, however, that recesses 70 may extend the entire width of the rotor and the end face sealing elements relocated to ensure effective sealing at the inner periphery of the working chambers, as will be explained below in relation to FIG. 7.

During full load operation when the rotor reaches a position of, for example, 55° rotation of the shaft before the top dead center position, a relatively flat fan-like spray of fuel is initiated from the nozzle toward the working face of the rotor. The nozzle is positioned in a predetermined position in the peripheral wall, as illustrated, and its spray axis is oriented so as to spray the fuel into the working chamber in the direction of lobe junction 48 and toward the rotor working face so as to strike the surafce of the working face, preferably at a small angle with respect to the rotor face at the instantaneous position of 55° shaft rotation before top dead center. It has been found that satisfactory operation is obtained with a spray angle having a range of 0° to 30°, but that best results are obtained when the spray angle is preferably within the range of 0° to 10°. Since the rotor rotates with respect to the fixed nozzle 44, in order to maintain the desired angle of spray of 0° to 10°, as stated above, each of the working face recesses 70 is shaped so that as the rotor rotates with respect to the fixed nozzle 44 the angle of spray at any position of the rotor during injection time will be within the preferred range of 0° to 10°. As stated above, during full load operation, the injection of fuel is preferably initiated at 55° before the top dead center position and in this embodiment is preferably continued until the position of 0° shaft angle, or top dead center position is reached. However, the injection of the fuel in this embodiment may be initiated within a range from 70° to 40° before top dead center and may be terminated within a range of 20° before top dead center to the 0° or top dead center position. As stated above, the engine described herein is intended to run with unthrottled air flow during all load conditions of operation. At less than full load operation, termination of the fuel injection may be earlier than top dead center position and injection may also be initiated at a later position of shaft rotation. It is apparent from the above discussion that, as the rotor rotates with respect to the nozzle 44, the spray of fuel will be deposited on successive portions of the working face of the rotor and will in addition be pushed against said outer face as a solid film due to the rising compression pressure in the working chamber. In this embodiment, the earlier the injection the deeper the spray of fuel must penetrate through the compressed air toward the working face recess. However, the deep penetration has to overcome a lower air pressure than the shallow penetration.

During engine operation each working chamber rotates around its outer body axis. The resulting relative motion and friction between the air in a working chamber and the walls of the chamber, particularly the stationary outer body walls, causes the air to swirl in its chamber. This swirling action and the air temperature rise produced during the compression phase of a working chamber causes evaporation of the film of fuel deposited or described on its rotor working face of said chamber. Also, the evaporation of the fuel from the rotor working face may be further controlled by regulating the cooling of the rotor faces through a suitable system of cooling the interior of the rotor, as pointed out above. As the rotor moves toward the region of top dead center position, the temperature and pressure will rise to a point wherein the fuel-air mixture first formed will reach the proper conditions for initiation of combustion. However, as is well known, the solid fuel film not yet mixed with air, or evaporated in this case, will not ignite since a proper combustible fuel-air mixture will not have been formed and thus the burning of the fuel within the chamber will be gradual or controlled until all of the fuel is shaved off and mixes with the air to form a combustible mixture and it totally consumed. By this means, it can be seen, that the fuel is distributed over the working faces of the rotor for facilitating the mixing of the fuel with the proper amount of combustion air and that uncontrolled burning or instantaneous combustion with its adverse effects are eliminated regardless of the ignition quality and anti-knock quality of the fuel used.

So it can be seen that due to the structure and operation of the present invention a multiplicity of fuels can be used and better fuel economy can be achieved since the burning of the fuel is controlled and the entire mixture will be consumed, thus eliminating any problem of wasted fuel which may be lost in the exhaust gases or be later instantaneously ignited and cause engine knock. It has been found that when using the construction of the embodiment of the invention described above, wherein spray of fuel is initiated at 55° before top dead center in a downstream direction against the working face of the rotor, the fuel film thickness is greatest for fuel injection between 40° and 20° before top dead center which is considered beneficial for combustion near the top dead center position. Ignition of the fuel-air mixture is normally initiated from 10°–30° shaft rotation after initiation of the injection of fuel.

Figure 5:
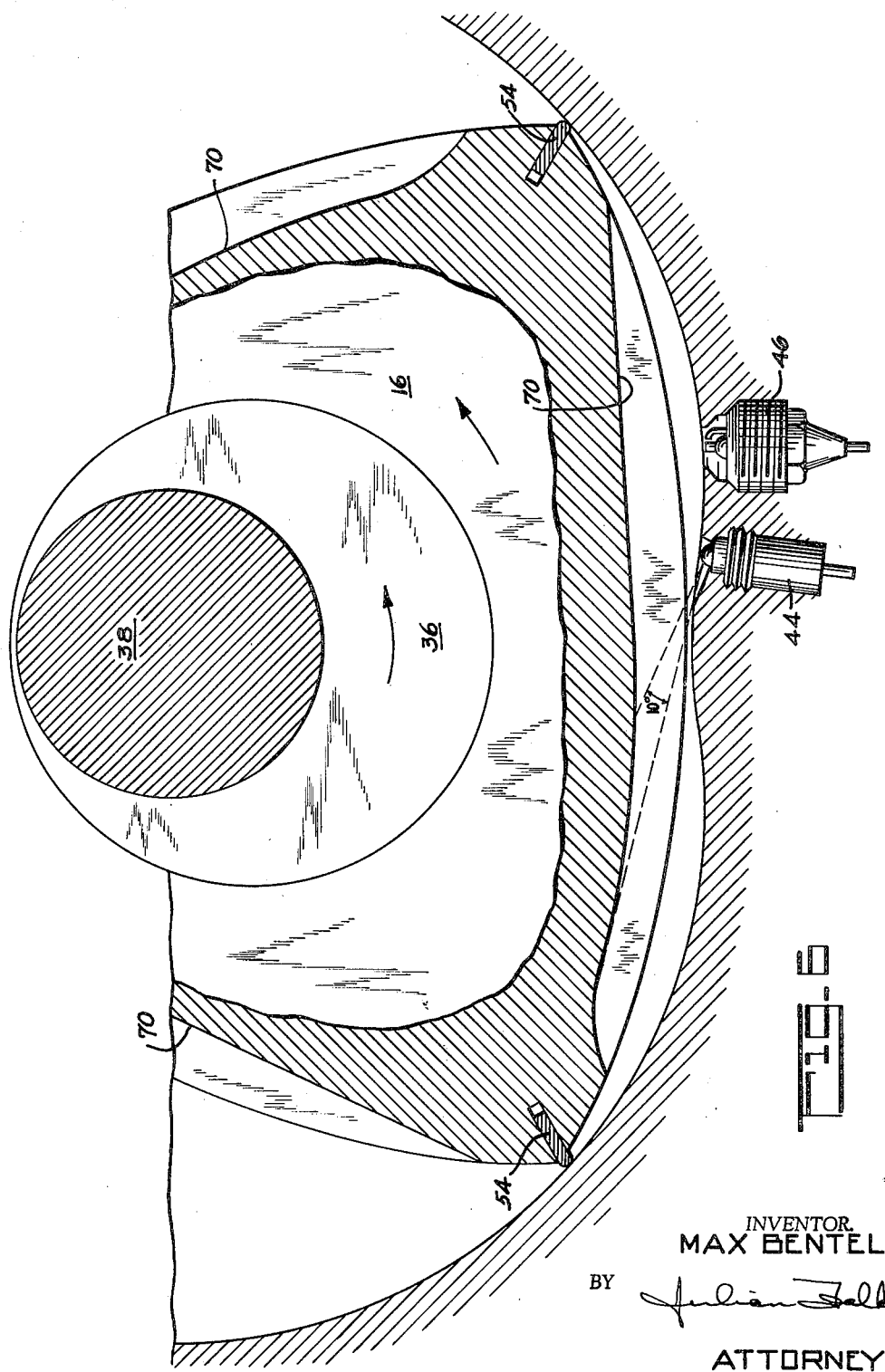

FIGS. 5 and 6 show another embodiment of the invention in which the fuel injection nozzle 44 is located on the opposite side of the lobe junction 48 from that of the embodiment shown in FIGS. 1 to 4. As shown in FIGS. 5 and 6, the nozzle 44 is located downstream with respect to the direction of rotation of the rotor 16 and is positioned so as to inject a relatively flat fan-like spray of fuel upstream in the direction of lobe junction 48 at an angle of 0° to 10° toward the rotor face. More specifically, in an engine having a two-lobed epitrochoid and a three-lobed rotor, as illustrated, for upstream injection the nozzle 44 may be located in the peripheral wall downstream from the minor axis of the outer body within a portion of said wall whose two peripheral limits are refined by an apex portion rotated from the minor axis of the outer body in the direction of rotor rotation or in a downstream direction within a range of 30° shaft angle to 80° shaft angle. As illustrated in FIGS. 5 and 6 the trough-like recess 70 of this embodiment is sloped substantially radially inwardly and has an enlarged trailing portion as opposed to the substantially symmetrical recess of the embodiment shown in FIGS. 3 and 4. As in the case of the embodiment described above the recess 70 is designed so that as the rotor rotates with respect to the nozzle 44, the upstream spray emitted from the nozzle will always strike the rotor working face at an angle within the preferred range of 0° to 10° with respect to the rotor face. Therefore, fuel will be deposited on successive portions of the working face of the rotor as the rotor rotates with respect to the nozzle 44, as illustrated in FIGS. 5 and 6 wherein the rotor is shown at 55° before top dead center, measured on the engine shaft and 0°, or top dead center, respectively. Again the spray of fuel is preferably initiated at a position of 55° before top dead center and is preferably terminated at 0° or top dead center, although in this embodiment injection may be initiated from 70° to 40° before top dead center and terminated from 10° before top dead center to 10° after top dead center. However, in this embodiment, the later the injection time and the higher the compression pressures, the deeper the spray of fuel must penetrate the working face recess. As compared to the embodiment discussed above, deeper penetration of the fuel spray is required at later injection times as opposed to deeper penetration at earlier injection times. The distribution of the film of fuel on the rotor face is substantially uniform in this embodiment thus leading to a perfect mixing with the combustion air and a short effective combustion period will be achieved. Since the nozzle 44 is located in a relatively hot zone of the engine in the embodiment it is of course to be understood that suitable means (not shown) for cooling the recess area bearing the nozzle 44 are provided. The location of the spark plug 46 in the embodiment illustrated in FIGS. 5 and 6 may vary from the position illustrated therein at 46 and as explained above, the spark plug location may vary between the position in the peripheral wall illustrated by point A in FIG. 5 and the position in the peripheral wall illustrated at point B. The operation of this embodiment of the invention is essentially the same as that discussed above in connection with FIGS. 3 and 4.

Figure 7:
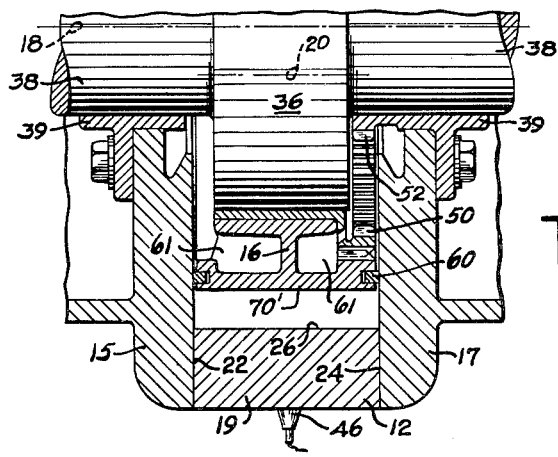
FIG. 7 shows a portion of a rotary combustion engine similar to that of FIG. 2 and illustrates another type rotor which may be used in the invention.

FIG. 7 shows an alternate form of rotor which may be used in the rotating combustion engine of the invention. As can be seen in FIG. 2 for example, the trough-like recess 70, which is formed in each rotor working face, extends axially only part way across the width of the rotor and has a rail portion on each side thereof formed by the faces 28 and 30 of the rotor. However, in the rotor of FIG. 7, instead of said trough-like recesses, each working face of the rotor is cut back, as indicated at 70', axially across the entire width of the rotor, as illustrated in FIG. 7. When injecting fuel onto the surface of each working face of the rotor of FIG. 7, the entire width of each rotor working surface can now be covered with fuel. Due to the structure of the rotor of FIG. 7 a more compact combustion chamber is obtained which has a lower surface to volume ratio than a rotor of the type shown in FIG. 2. Substantially all of the combustion air present in the combustion chamber formed in part by recess 70' is utilized for combustion as opposed to the rotor of FIG. 2 for example, wherein some of the air between the rail portions on each side of the rotor and the inner surface of the peripheral wall may be lost for combustion. This form of rotor also has advantages in the simplification of machining each working face and the reduction in weight of the rotor due to the elimination of the rail portions. The end face seals 56 are suitably relocated to provide effective sealing for the working chambers of rotor in a radially inward direction.

In FIG. 8 there is shown another embodiment of the invention where the fuel injection nozzle 44' is located in a recess in one of the side housings of the outer body instead of the peripheral wall 12, as described above. The nozzle 44' is oriented so that the spray of fuel emitted therefrom will be directed in a downstream direction and strike the working faces of the rotor in the manner described above, as illustrated in FIG. 8. Of course it should be understood that the nozzle 44' may also be suitably located for upstream injection, as described in relation to FIGS. 5 and 6. In the embodiment of FIG. 8 the nozzle is located in the relatively cool side housing and therefore as pointed out above, cooling of the nozzle is facilitated and coking and cracking of the fuel within the nozzle is eliminated. Also the elimination of the recess in the peripheral wall for the nozzle is structurally advantageous since this wall is subject to substantial operating stresses, particularly at its seal engaging surface. Further, the elimination of the recess from the peripheral wall serves to minimize the leakage of any of the gases between the faces of the apex seals and into an adjacent working chamber as the apex seal crosses the opening in the peripheral wall, which may be present due to the location of the recess in the peripheral wall. The spray of fuel from the nozzle 44' in this embodiment is emitted in a relatively axially-wide cone-like form in order to cover the entire width of the working face recess 70' or 70. Of course, it should be understood that two nozzles 44' may be used in either one of the side housings or one in each of the side housings. The operation of this embodiment of the invention is similar to that described above and injection may be either upstream or downstream, as pointed out above.

It can be seen from the above detailed description that a fuel injection system is provided which results in controlled burning of the fuel-air mixture without any adverse effects such as engine knock and without any specific limitations on the type of fuel used. The engine will operate satisfactorily with fuels of a wide boiling range having low ignition qualities and low anti-knock qualities as well as with those having high ignition and anti-knock qualities and further the engine may operate with relatively low compression ratios. The engine is intended to be operated with unthrottled air or in other words free of any variable throttle means under all load conditions. Thus, at part-load operation, the engine will run on leaner mixtures with consequent reduction in fuel consumption. It should, of course, be understood that the nozzle location and chamber configuration may be altered as varying results are desired or for different engine configurations.

While the invention has been set forth in detail in the above description it is not intended that it be so limited and it will be apparent to those skilled in the art that various changes and modifications may be made without departing from the spirit and scope of the invention as defined in the following claims.

I claim:
1. A rotary combustion engine comprising an outer body having a pair of spaced end walls and a peripheral wall disposed between the end walls to form a cavity therebetween having an axis along which the end walls are spaced, the inner surface of said peripheral wall having a multi-lobed profile; a shaft co-axial with the outer body cavity and having an eccentric portion; a rotor disposed within the cavity and journaled on the shaft eccentric portion, said rotor having a plurality of apex portions forming a rotor working face between each adjacent pair of apex portions with said apex portions having sealing cooperation with said peripheral wall inner surface to form a working chamber between each adjacent pair of apex portions such that each such chamber is formed by the adjacent wall portions of the outer body and the associated working face of the rotor each said working face having a trough-like recess formed therein with the bottom of each said recess having a greater angle with the working face to form a deeper portion in a radially inward direction at one end than at its other end; intake means for admitting air into said working chambers for combustion therein adjacent one junction of the lobes of said peripheral wall inner surface, said intake means being free of any variable throttle means and exhaust means for expelling the burnt gases from said engine; fuel nozzle means for injecting fuel into said working chambers for combustion therein adjacent said one junction of the lobes of said peripheral wall inner surface, said fuel nozzle means being carried by said outer body to one side of said lobe junction and having its fuel spray directed into the outer body cavity toward said lobe junction; means for initiating injection of fuel from said nozzle means into a working chamber before the top dead center position of its working face and continuing said fuel injection until said working face has reached a position adjacent said lobe junction, the orientation of the fuel spray and the profile of the working face being such that said fuel spray is directed onto a working face at an angle of less than 30° with said working face throughout the fuel injection period.

2. A rotary combustion engine as recited in claim 1 wherein at least during full load operation said injection of fuel is initiated into said working chambers at an angle of shaft rotation within the range of 70°–40° befor their top dead center positions.

3. A rotary combustion engine as recited in claim 2 wherein said fuel nozzle means is positioned in said peripheral wall for injection of said fuel into said working chamber in a downstream direction and said fuel injection is terminated at least during full load operation at an angle of shaft rotation within the range 20°–0° before top dead center position.

4. A rotary combustion engine as recited in claim 3 wherein said deeper portion of each recess is disposed at the end of said recess in the direction of the injection of said fuel.

5. A rotary combustion engine as recited in claim 3 wherein the inner surface of said peripheral wall preferably is basically a two-lobed epitrochoid and said rotor has three apex portions and wherein said fuel nozzle means is positioned upstream from the minor axis of said outer body within a portion of said peripheral wall whose peripheral limits are defined by an apex portion of said rotor rotated in an upstream direction from said minor axis within a range of 140° shaft angle to 180° shaft angle.

6. A rotary combustion engine as recited in claim 2 wherein said fuel nozzle means is positioned in said peripheral wall for injection of said fuel into said working chambers in an upstream direction and said fuel injection is terminated at least during full load operation at an angle of shaft rotation within the range of 10° before top dead center position to 10° after top dead center position.

7. A rotary combustion engine as recited in claim 6 wherein the inner surface of said peripheral wall preferably is basically a two-lobed epitrochoid and said rotor has three apex portions and wherein said fuel nozzle means is positioned downstream from the minor axis of said outer body within a portion of said peripheral wall whose peripheral limits are defined by an apex portion of said rotor rotated in a downstream direction from said minor axis within a range of 30° shaft angle to 80° shaft angle.

8. A rotary mechanism as recited in claim 6 wherein a trough-like recess is formed in each working face of said rotor said trough-like recess being sloped substantially radially inwardly and having an enlarged trailing portion formed at one end thereof.

9. A rotary combustion engine as recited in claim 1 wherein ignition means are provided for initiating combustion at least during full load operation at an angle of shaft rotation within the range 10°–30° after initiation of said injection fuel.

10. A rotary combustion engine as recited in claim 9 wherein the inner surface of said peripheral wall preferably is basically a two-lobed epitrochoid and said rotor has three apex portions and wherein said ignition means comprises a spark plug positioned in a portion of said peripheral wall whose peripheral limits are defined by an apex portion of said rotor rotated from a position of 60° shaft angle upstream from the minor axis of said outer body to a position of 80° shaft angle downstream of said minor axis.

11. A rotary combustion engine as recited in claim 1 wherein said spray of fuel is directed at an angle within the range of 0°–10° with said working face.

References Cited by the Examiner

UNITED STATES PATENTS 3,136,302  6/64  Nallinger et al. ---------- 123—8

FOREIGN PATENTS 1,287,176  1/62  France.

References Cited by the Applicant

UNITED STATES PATENTS 3,053,238  9/62  Meurer.

FOREIGN PATENTS 893,789  4/62  Great Britain.

KARL J. ALBRECHT, *Primary Examiner.*

JOSEPH H. BRANSON, JR., *Examiner.*